United States Patent [19]
Wortham

[11] Patent Number: 5,219,034
[45] Date of Patent: Jun. 15, 1993

[54] VEHICLE WITH MAGNETIC ENGINE

[76] Inventor: Charles Wortham, Rte. 1 Box 428, Shongaloo, La. 71072

[21] Appl. No.: 858,036

[22] Filed: Mar. 26, 1992

[51] Int. Cl.⁵ .................................................. B60K 1/00
[52] U.S. Cl. ..................................... 180/65.3; 310/15
[58] Field of Search .................... 180/65.1, 65.3, 65.4, 180/65.6, 165; 310/15, 14, 17, 46, 20, 23, 152; 318/3, 9

[56] References Cited

U.S. PATENT DOCUMENTS

| | | | |
|---|---|---|---|
| 4,663,937 | 5/1987 | Cullin | 180/65.3 |
| 4,928,227 | 5/1990 | Burba et al. | 180/15.3 |
| 4,951,769 | 8/1990 | Kawamura | 180/65.4 |
| 5,036,930 | 8/1991 | Bisel et al. | 180/65.1 |

Primary Examiner—Richard M. Camby
Attorney, Agent, or Firm—John M. Harrison

[57] ABSTRACT

A vehicle powered by a magnetic engine, which engine includes a block fitted with multiple cylinders for receiving magnetic pistons attached to a crankshaft and electromagnets mounted in the engine head for magnetically operating the magnetic pistons by electric current reversal. A polarity timer is connected to the vehicle battery through a variable resistor which serves as an accelerator to vary the current through the respective electromagnets and operate the magnetic pistons at a desired speed. Alternating current is generated at the rear axle of the vehicle by means of an alternating current generator, which current is stepped up and rectified to direct current for charging the battery, by operation of a battery charging device.

18 Claims, 2 Drawing Sheets

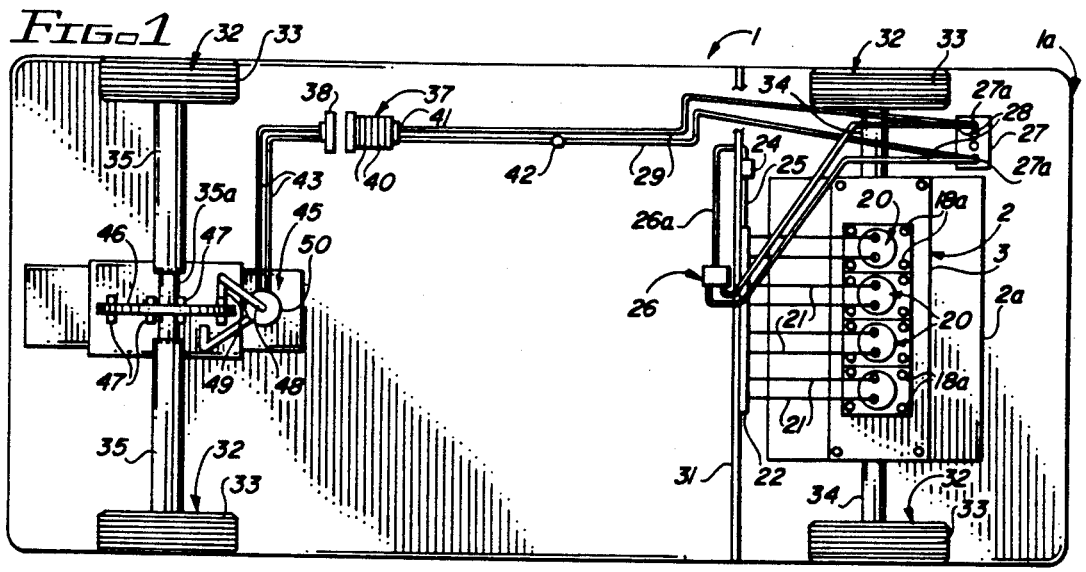
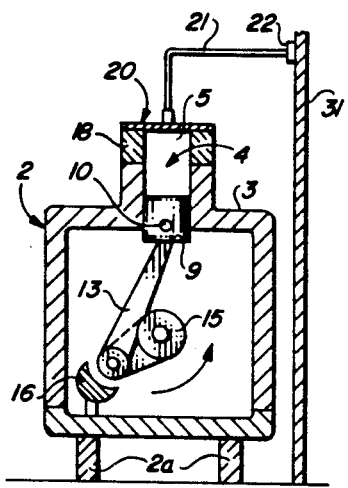
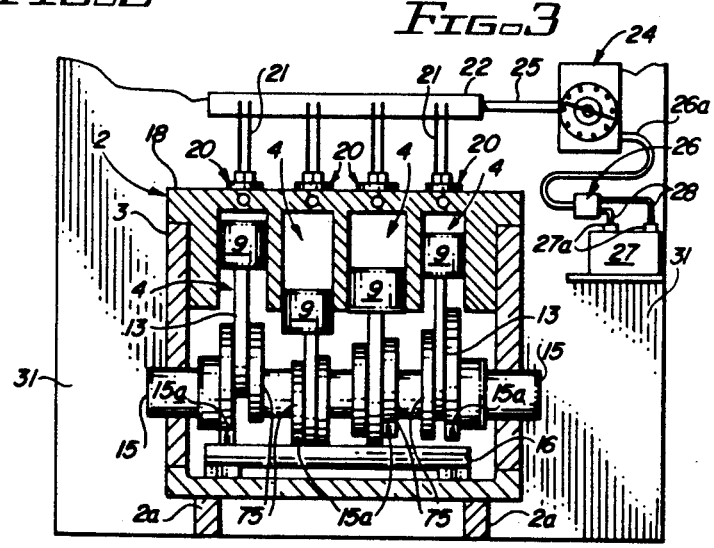
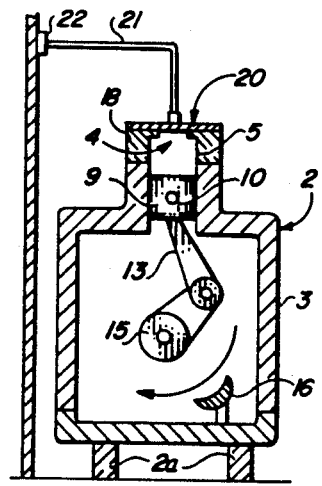
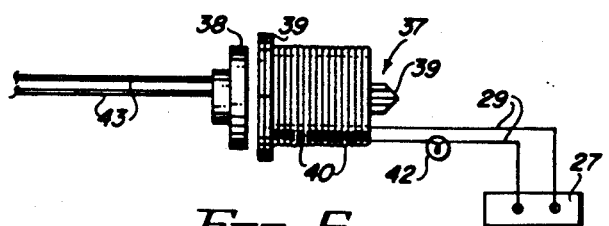

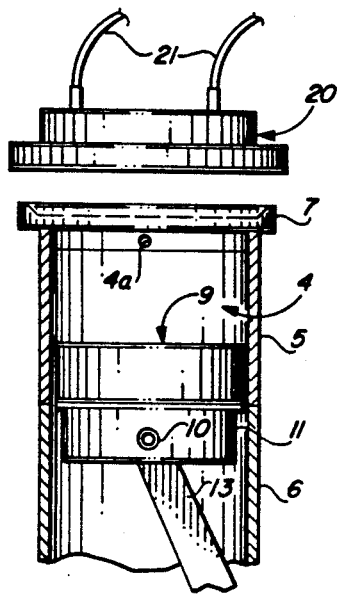
FIG. 6
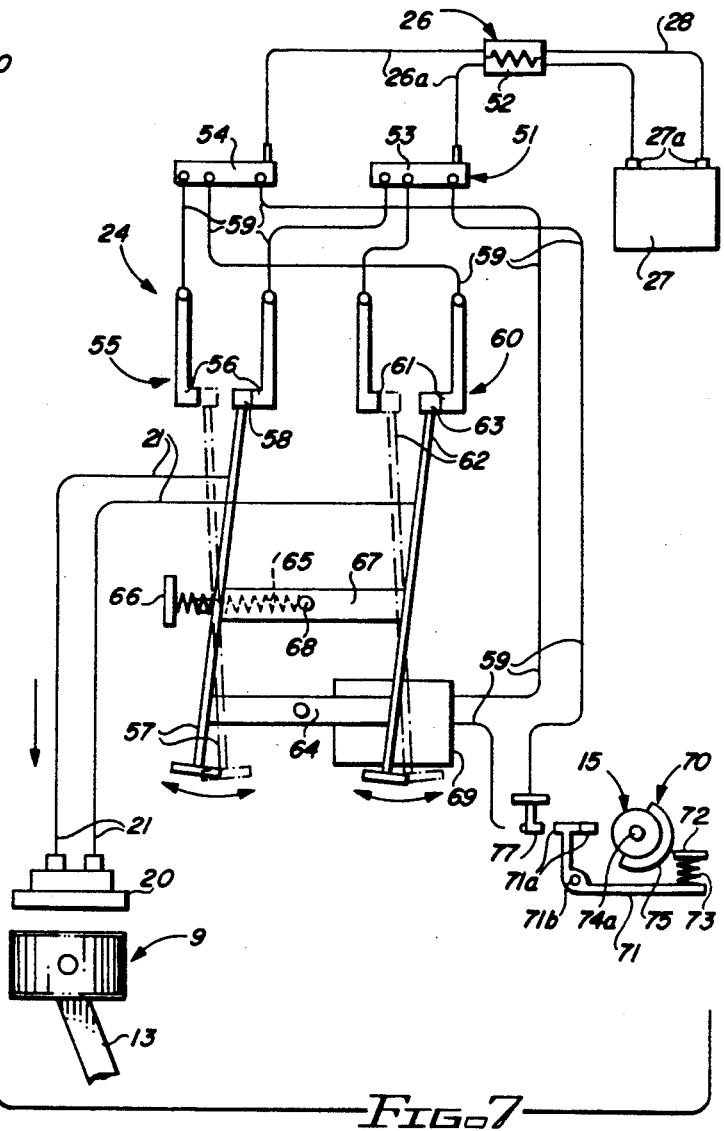
FIG. 7
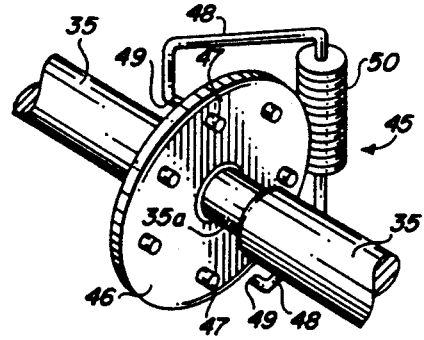
FIG. 10
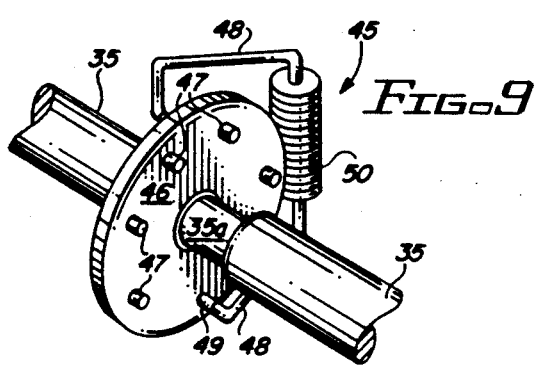
FIG. 9
FIG. 8

VEHICLE WITH MAGNETIC ENGINE

BACKGROUND OF THE INVENTION

1. Field of the Invention

This invention relates to magnetically-operated vehicles and more particularly, to a vehicle having a magnetic engine and battery-charging apparatus, which vehicle is capable of sustained operation. The magnetic engine is characterized by an engine housing or block fitted with a crankshaft, cylinders for receiving magnetic pistons conventionally attached to the crankshaft and electromagnets mounted in the engine head for magnetically attracting and repelling the magnetic pistons in the cylinders in a selected sequence and driving the crankshaft. The crankshaft is connected to a conventional transmission for operating the vehicle in conventional fashion. The order of magnetic attraction and repulsion of the magnetic pistons by operation of the current reversing electromagnets is determined by a polarity timer connected to the vehicle battery by means of a variable resistor accelerator. Continuous charging of the battery is effected by means of a battery charger which receives alternating current generated at the rear axles of the vehicle by means of an alternating current generator, which battery charger first steps up the alternating current received from the alternating current generator and subsequently rectifies the current for charging the battery. In a most preferred embodiment of the invention the polarity timer includes a set of positive and negative terminal relays operated by rotation of the crankshaft to switch the current in the electromagnets in a selected order for determining respective attraction and repulsion of the magnetic pistons in the magnetic engine. An electromagnet motion enhancer may be mounted in the engine block for magnetically attracting or repelling bar magnets mounted in the crankshaft and increasing the torque of the crankshaft.

It is an object of this invention to provide a vehicle having a magnetic engine characterized by an engine block fitted with cylinders and magnetic pistons connected to a crankshaft in conventional fashion and further provided with electromagnets for operating the magnetic pistons in a selected sequence and powering the vehicle.

Another object of this invention is to provide a vehicle driven by a magnetic engine, which engine is operated by magnetic pistons reciprocating in cylinders and connected to a crankshaft, the cylinders being subjected to downward and upward magnetic forces generated by electromagnets operated by a polarity timer attached to the vehicle battery.

Yet another object of this invention is to provide a vehicle having a magnetic engine, which magnetic engine is operated by electromagnets magnetically interacting with magnetic pistons and a vehicle battery which is rechargable by operation of a battery charger that converts alternating current generated by operation of an alternating current generator using the rotating rear axles as a motive force.

Still another object of this invention is to provide a new and improved vehicle operated by a magnetic engine fitted with conventional cylinders, magnetic pistons and a crankshaft fitted with bar magnet inserts, which magnetic pistons are caused to reciprocate in the respective cylinders by means of separate electromagnets operated by a polarity timer energized by a variable resistor or rheostat which serves as an accelerator. The polarity timer and variable resistor are connected to the vehicle battery and the battery is charged by a rectified electric current generated by an alternating current generator at the rear axle of the vehicle.

SUMMARY OF THE INVENTION

These and other objects of the invention are provided in a new and improved vehicle powered by a magnetic engine, which magnetic engine is fitted with multiple magnetic pistons reciprocating in corresponding cylinders that drive a crankshaft attached to a conventional transmission, the magnetic pistons being operated by separate electromagnets. The electromagnets are energized to sequentially reverse polarity by a polarity timer connected to a variable resistor accelerator and a battery. In a preferred embodiment the battery is continuously charged by a battery charger using direct current which is rectified from an alternating current generated by an alternating current generator mounted on the rear axle of the vehicle.

BRIEF DESCRIPTION OF THE DRAWINGS

The invention will be better understood by reference to the accompanying drawings, wherein:

FIG. 1 is a top view of the essential elements of the vehicle with magnetic engine of this invention;

FIG. 2 is a right end sectional view of the magnetic engine illustrated in FIG. 1;

FIG. 3 is a side sectional view of the magnetic engine illustrated in FIGS. 1 and 2;

FIG. 4 is a left end sectional view of the magnetic engine illustrated in FIGS. 1-3;

FIG. 5 is a side view of a preferred battery charger element of the vehicle with magnetic engine;

FIG. 6 is a side sectional view of a typical magnetic piston, cylinder and electromagnetic design of the magnetic engine illustrated in FIG. 1;

FIG. 7 is a front view of the essential elements of the polarity timer device for operating the magnetic engine illustrated in FIGS. 1-4;

FIG. 8 is a perspective view, partially in section, of a preferred alternating current generator in a first operational configuration for generating an alternating current;

FIG. 9 is a perspective view, partially in section, of the alternating current generator illustrated in FIG. 8 in a second operational configuration; and FIG. 10 is a front view of the alternating current generator illustrated in FIGS. 8 and 9.

DESCRIPTION OF THE PREFERRED EMBODIMENTS

Referring initially to FIGS. 1-4 and 6 of the drawings, the vehicle with magnetic engine of this invention is generally illustrated by reference numeral 1. The vehicle 1 includes a vehicle frame 1a, which is illustrated with no specific structural configuration, the structural components being conventional in design. Wheels 32, with tires 33, are rotatably mounted on front axles 34 and on rear axles 35, connected by an axle connector 35a, respectively. The vehicle 1 includes a magnetic engine 2, fitted with a conventional engine mount 2a for mounting the magnetic engine 2 on the vehicle frame 1a in conventional fashion. The magnetic engine 2 includes an engine block 3 fitted with four cylinders 4, each of the cylinders 4 having a cylinder vent 4a, to remove air from the cylinders 4 during operation of the magnetic engine 2, as hereinafter further described. Each of the cylinders 4 further constitutes a cylindrical magnet having a positive top segment 5 and a negative bottom segment 6, as illustrated in FIG. 6. A cylinder cap 7 is provided on top of each of the cylinders 4 adjacent the positive segment 5, as further illustrated in FIG. 6. Each of the cylinders 4 receives a magnetic piston 9 in reciprocating fashion and each of the magnetic pistons 9 is further characterized by piston shielding 11 which creates a non-magnetic effect on the lower portion of the magnetic piston 9, as further hereinafter described. A wrist pin 10 extends transversely through each of the magnetic pistons 9 to receive one end of a connecting rod 13, the opposite end of the connecting rod 13 being connected to a crankshaft 15 in conventional fashion. Crankshaft bar magnets 15a are inserted in the crankshaft balancing weights 75 of the crankshaft 15 as further illustrated in FIG. 3, for purposes which will be hereinafter described. A piston enhancer 16 is mounted in the lower portion of the engine block 3 and in a preferred embodiment is characterized by internal wiring to facilitate charging the piston enhancer 16 either positively or negatively, as an electromagnet, as desired. An engine head 18 is bolted to the top of the engine block 3 using head bolts 18a and four piston electromagnets 20 are mounted in the engine head 18 in spaced relationship above each of the corresponding cylinders 4 and magnetic pistons 9, as further illustrated in FIGS. 1-4. Electromagnetic wiring 21 extends in pairs from the piston electromagnets 20 to a wiring header 22 and timer-header wiring 25 projects from the wiring header 22 to a polarity timer 24, as further illustrated in FIGS. 1 and 3. An accelerator 26 is connected to the polarity timer 24 by means of accelerator wiring 26a and to the battery terminals 27a of a battery 27, by means of battery wiring 28, as further illustrated in FIGS. 1 and 3.

Referring again to FIG. 1 of the drawings, battery charge wiring 29 projects from the respective battery terminals 27a through the firewall 31 of the vehicle 1 to a battery charger 37. Furthermore, battery charger electric wiring 43 extends from the battery charger 37 rearwardly to the alternating current generator 45 mounted in close proximity to the rear axle 35 and axle connector 35a.

Referring now to FIGS. 1, 3 and 7 of the drawings, in a most preferred embodiment of the invention the polarity timer 24 is designed to orchestrate operation of the respective magnetic pistons 9 in the cylinders 4 of the magnetic engine 2. The polarity timer 24 is characterized by a dual relay apparatus 51, which includes a positive wiring terminal 53 and a negative wiring terminal 54 connected to the accelerator 26, which contains a variable resistor 52, by means of accelerator wiring 26a. The variable resistor 52 is, in turn, connected to the battery terminals 27a of the battery 27 by means of a battery wiring 28. The positive wiring terminal 53 and negative wiring terminal 54 are used to provide power to a positive terminal relay 55 and negative terminal relay 60, that supply current to the respective piston electromagnets 20. The positive terminal relay 55 and the negative relay 60 are designed to reverse the flow of current through the windings (not illustrated) in the piston electromagnets 20 to orchestrate the attraction and repulsion of the respective magnetic pistons 9 and operate the crankshaft 15 in a smooth and continuous manner, as in the case of conventional internal combustion engines. Accordingly, the positive terminal relay 55 is characterized by a pair of positive terminal contacts 56 mounted in spaced, opposed relationship and connected to the positive wiring terminal 53 and the negative wiring terminal 54, respectively, by means of dual relay wiring 59. Similarly, the negative terminal relay 60 is characterized by a pair of spaced, opposed negative terminal contacts 61, also connected to the positive wiring terminal 53 and negative wiring terminal 54 by means of additional dual relay wiring 59. A positive pivot arm 57 is disposed such that a corresponding positive pivot arm contact 58 is located between the positive terminal contacts 56 with sufficient spacing to switch back and forth in pivoting fashion and alternately contact the positive terminal contacts 56. Similarly, a negative pivot arm 62 is disposed such that a negative pivot arm contact 63 is located between the respective negative terminal contacts 61 and switches back and forth between the negative terminal contacts 61, as hereinafter further described. The positive pivot arm 57 and negative pivot arm 62 are joined in pivotal relationship by means of a switching spring bar 67 and a connecting plate 64, such that the positive pivot arm 57 and negative pivot arm 62 pivot in parallel, spaced relationship to switch the positive pivot arm contact 58 between the positive terminal contacts 56 and the negative pivot arm contact 63 between the negative terminal contacts 61, respectively. A switching spring 65 extends between a fixed switching spring mount 66 and a bar pin 68 mounted on the switching bar 67, to normally bias the positive terminal relay 55 and negative terminal relay 60 in the position illustrated. This switching function is controlled by operation of a separate timing apparatus 70, provided for each of the magnetic pistons 9, which depends upon operation of the crankshaft 15 in the magnetic engine 2. A base plate 71 is pivotally mounted beneath the crankshaft 15 on a plate pivot pin 71b and a spring mount 72 receives one end of a contact spring 73, also mounted on the base plate 71 adjacent to the crankshaft 15. A plate contact 71a projects from the top portion of the base plate 71 in close proximity to the crankshaft balancing weights 75 of the crankshaft 15. A relay contact 77 is located in close proximity to the plate contact 71a and is connected by means of dual relay wiring 59 to a pivot arm electromagnet 69, mounted in cooperation with the negative pivot arm 62, for purposes which will be hereinafter further described.

Referring now to FIGS. 1, 5 and 8-10 of the drawings, in another preferred embodiment of the invention the alternating current generator 45 is mounted near the rear axle 35 of the vehicle 1 and includes an axle connector disc 46, mounted on the axle connector 35a of the rear axles 35. The axle connector disc 46 is provided with spaced disc magnets 47, further illustrated in FIGS. 8-10 and a shaped, laminated metal generator bar 48 is provided with generator bar tips 49 on the extending ends thereof and receives a generator bar coil 50 near the center thereof. It will be appreciated by those skilled in the art that the generator bar 48 and generator bar coil 50 may be mounted on a suitable fixed bracket (not illustrated) in order to place the flux-receiving generator bar tips 49 in close proximity to the respective disc magnets 47 on the axle connector disc 46, as illustrated in FIGS. 8-10. Accordingly, rotation of the rear axles 35 during operation of the vehicle 1 causes the axle connector disc 46 and disc magnets 47 to rotate, thereby generating an alternating current in the generator bar 48 by operation of the generator bar coil 50, as in a magneto, since the generator bar tips 49 are mismatched as to the respective disc magnets 47 during rotation of the axle connector disc 46. This alternating current is directed to the battery charger electromagnet 38 component of the battery charger 37 by means of battery charger electrical wiring 43, as is more particularly illustrated in FIG. 5. This current is "stepped up" by operation of the battery charger 37, which includes a set of back-to-back, L-shaped laminated plates 39, fitted with current amplifier coils 40 and a core member 41 which components are positioned opposite the battery charger electromagnet 38. The "stepped-up" alternating current generated in the battery charger 37 is rectified by operation of a diode 42, to direct current, which is transmitted through the battery charge wiring 29 to the battery 27, for continuously charging the battery 27 during operation of the magnetic engine 2 and vehicle 1.

In operation, and referring again to the drawings, the vehicle 1 is operated by initially energizing the magnetic engine using a conventional key and switch (not illustrated). The accelerator 26 is then pressed with the foot in conventional fashion to vary the resistance in the variable resistor 52 and effect a current flow from the battery 27 through the battery wiring 28 and resistor 52 and subsequently through the accelerator wiring 26a to the dual relay apparatus 51, as illustrated in FIG. 7. At this point in time the positive terminal contacts 56 in the positive terminal relay 55 and the negative terminal contacts 61 in the negative terminal relay 60 are in the normally closed position by operation of the switching spring 65 and the pivoting action of the respective parallel positive pivot arm 57 and negative pivot arms 62, connected by the switching spring bar 67 and the connecting plate 64. The current is therefore allowed to flow in a first direction through the closed set of positive terminal contacts 56 and positive pivot arm contact 58 and negative terminal contacts 61 and negative pivot arm contact 63, through the respective piston electromagnetics 20 to attract the magnetic pistons 9 located in cylinders 2 and 3 and repel the magnetic pistons 9 located in cylinders 1 and 4, as illustrated in FIGS. 1 and 3. This operation causes the crankshaft 15 to rotate by operation of the respective connecting rods 13 and rotation of the crankshaft 15 causes the respective crankshaft balancing weights 75 to contact the plate contacts 71a in sequence and the plate contacts 71a to touch the relay contacts 77 as the base plate 71 pivots on the plate pivot pin 71b against the bias of the contact spring 73 to reverse the polarity of the pivot arm electromagnet 69, which action in turn, pivots the positive pivot arm 57 and negative pivot arm 62 against the bias of the switching spring 65 to switch the positive terminal contacts 56 and negative terminal contact 61 to the position illustrated in phantom in FIG. 7. This action in turn reverses the polarity of the piston electromagnets 20 and causes current to flow in reverse direction through the windings (not illustrated) in the piston electromagnets 20 to repel the magnetic pistons 9 in the numbers 2 and 3 cylinders and attract the magnetic pistons 9 in the numbers 1 and 4 cylinders, in sequence. Constant pressure on the accelerator 26 causes this switching function to occur with a frequency which is proportional to the depression of the accelerator 26. Accordingly, since the magnetic pistons 9 are arranged in the respective cylinders 4 in a one-fourth travel distance stagger, as illustrated in FIG. 3, the current reversing operation of the corresponding piston electromagnets 20 effects continuous reciprocation of the magnetic pistons 9.

Charging of the battery 27 is continuously effected during operation of the magnetic engine 2 and vehicle 1 by operation of the battery charger 37 and the alternating current generator 45. As the alternating current is generated from the alternating current generator 45 as described above, that current is transmitted to the battery charger electromagnet 38 through the battery charger electric wiring 43 and the battery charger 37 acts as a "step-up" induction transformer to increase the alternating current flowing into the battery charger wiring 29. At that point the diode 42 operates to change the alternating current to half wave rectified current, for continuously charging the battery 27.

It will be appreciated by those skilled in the art that a conventional transmission (not illustrated) may be connected to the crankshaft 15 by operating the vehicle 1 either manually or automatically, according to the knowledge of those skilled in the art. Furthermore, the cylinder vents 4a located in the respective cylinders 4 are connected to the exhaust manifold (not illustrated) of the vehicle 1, in order to provide an audible indication that the magnetic engine 2 is operating when the vehicle 1 is stopped, for example, at traffic signals. The noise is generated by air forced from the respective cylinders 4 by operation of the respective magnetic pistons 9 and is therefore commensurate in intensity to the speed of operation of the magnetic engine 2 and the vehicle 1.

Referring again to FIG. 6 of the drawings, it will be appreciated by those skilled in the art that the piston shielding 11 located on each of the magnetic pistons 9 may be aluminum, plastic or like material, to negate the attractive magnetic effect between the negative segment 6 of the cylinders 4 and the lower portion of the magnetic pistons 9. Each of the magnetic pistons 9 descend approximately to the position illustrated in FIG. 6, such that the top portion of each of the magnetic pistons 9 is never directly exposed to the adjacent negative segments 6 of the cylinders 4. Furthermore, the clearance between the magnetic pistons 9 and the corresponding cylinders 4 is preferably in the range of from about 0.015 to about 0.025, and most preferably, about 0.020 of an inch, to facilitate "floating" of the magnetic pistons 9 in magnetic flux generated by the positive segment 5 of each of the cylinders 4, the magnetic pistons 9 themselves and the piston electromagnets 20. This facility eliminates the need for lubricating the magnetic pistons 9.

Referring again to FIGS. 2-4 of the drawings, the piston enhancer 16 may be characterized as an electromagnet with internal windings (not illustrated) connected to the battery 27 and operated to present an alternating positive and a negative charge to the crankshaft magnets 15a to increase the torque of the crankshaft 15. Alternatively, permanent magnets may be utilized for the same effect.

It will be further appreciated by those skilled in the art that the various other components of the vehicle 1 not addressed herein may be conventional in design, including the frame, body, steering system, lighting systems, brakes and other conventional components of vehicles in general.

Accordingly, while the preferred embodiments of the invention have been described above, it will be recognized and understood that various modifications may be made therein and the appended claims are intended to cover all such modifications which may fall within the spirit and scope of the invention.

Having described my invention with the particularity set forth above, what is claimed is:

1. A vehicle comprising a vehicle frame fitted with axles and wheels rotatably carried by said axles; an engine block mounted on said frame; a plurality of magnetic cylinders provided in said engine block and a plurality of magnetic pistons disposed in said magnetic cylinders, respectively, in reciprocating relationship, said magnetic cylinders having a first magnetic polarity in one end and a second magnetic polarity in the opposite end for alternately attracting and repelling said magnetic pistons, respectively; a crankshaft journalled for rotation in said engine block; power transmission means connecting said crankshaft to at least one of said axles in driving relationship; and connecting rods connecting said crankshaft to said magnetic pistons, respectively, whereby reciprocation of said magnetic pistons in said magnetic cylinders effects rotation of said crankshaft; a cylinder head provided on said engine block and piston electromagnetic means provided in said cylinder head above said magnetic cylinders and said magnetic pistons, respectively for alternately attracting and repelling said magnetic pistons; at least one batter carried by said frame; and polarity timing means electrically connected to said battery and said piston electromagnetic means, for alternating the polarity of said piston electromagnet means, whereby electric current is supplied to said piston electromagnetic means in current-reversing relationship to alternately attract and repel said magnetic pistons in reciprocating relationship responsive to operation of said polarity timing means.

2. The vehicle of claim 1 further comprising battery charging means carried by said frame and electrically connected to said battery for recharging said battery.

3. The vehicle of claim 2 wherein said battery charging means further comprises alternating current generator means mounted on said frame and one of said axles for generating an alternating electric current responsive to rotation of said one of said axles and current amplifier means mounted on said frame and electrically connected to said alternating current generator means and said battery, for amplifying the alternating current from said alternating current generating means, converting the alternating current to direct current and charging said battery.

4. The vehicle of claim 1 further comprising piston enhancing means provided in said engine block and permanent crankshaft magnets provided in said crankshaft for magnetically interacting with said piston enhancing means and boosting the torque of said crankshaft.

5. The vehicle of claim 1 wherein said polarity timing means further comprises accelerator means electrically connected to said battery and dual relay means located adjacent to said crankshaft and electrically connected to said accelerator means and said piston electromagnet means, whereby rotation of said crankshaft actuates said dual relay means in a selected sequence for operating said piston electromagnet means and said magnetic pistons in said selected sequence responsive to manipulation of said accelerator means.

6. The vehicle of claim 5 further comprising battery charging means carried by said frame and electrically connected to said battery for recharging said battery.

7. The vehicle of claim 6 wherein said battery charging means further comprises alternating current generator means mounted on said frame and one of said axles for generating an alternating electric current responsive to rotation of said one of said axles and current amplifier means mounted on said frame and electrically connected to said alternating current generator means and said battery, for amplifying the alternating current from said alternating current generating means, converting the alternating current to direct current and charging said battery.

8. The vehicle of claim 5 further comprising piston enhancing means provided in said engine block and permanent crankshaft magnets provided in said crankshaft for magnetically interacting with said piston enhancing means and boosting the torque of said crankshaft.

9. The vehicle of claim 6 wherein said battery charging means further comprises alternating current generator means mounted on said frame and said rear axle for generating an alternating electric current responsive to rotation of said one of said axles and current amplifier means mounted on said frame and electrically connected to said alternating current generator means and said battery, for amplifying the alternating current from said alternating current generating means, converting the alternating current to direct current and charging said battery and further comprising piston enhancing means provided in said engine block and permanent crankshaft magnets provided in said crankshaft for magnetically interacting with said piston enhancing means and boosting the torque of said crankshaft.

10. The vehicle of claim 9 wherein said piston enhancing means further comprises a piston enhancing electromagnet.

11. A vehicle comprising a vehicle frame fitted with front axles and front wheels rotatably carried by said front axles; rear axles spaced from said front axles and rear wheels rotatably carried by said rear axles; an engine block transversely mounted on said frame over said front axles; a plurality of cylinders provided in said engine block and a plurality of magnetic pistons disposed in said cylinders, respectively, in reciprocating relationship; a crankshaft journalled for rotation in said engine block and power transmission means connecting said crankshaft to said front axles in driving relationship; connecting rods connecting said crankshaft to said magnetic pistons, whereby reciprocation of said magnetic pistons in said cylinders effects rotation of said crankshaft; a cylinder head provided on said engine block and piston electromagnetic means provided in said cylinder head above said cylinders and said magnetic pistons, respectively for alternately attracting and repelling said magnetic pistons; at least one battery carried by said frame; dual relay means electrically connected to said crankshaft and electrically connected to said piston electromagnetic means for operating said piston electromagnetic means responsive to rotation of said crankshaft; and accelerator means electrically connected to said dual relay means and said battery for operating said dual relay means, whereby rotation of said crankshaft electrically actuates said dual relay means in a selected sequence for operating said piston electromagnetic means and said magnetic pistons in said selected sequence at a selected speed responsive to manipulation of said accelerator means.

12. The vehicle of claim 1 further comprising battery charging means carried by said frame and electrically connected to said battery for recharging said battery.

13. The vehicle of claim 12 wherein said battery charging means further comprises alternating current generator means mounted on said frame and said rear axle for generating an alternating electric current responsive to rotation of said rear axles and induction current amplifier means mounted on said frame and electrically connected to said alternating current generator means and said battery, for amplifying the alternating current from said alternating current generating means, converting the alternating current to direct current and charging said battery.

14. The vehicle of claim 13 further comprising piston enhancing means provided in said engine block and permanent crankshaft magnets provided in said crankshaft for magnetically interacting with said piston enhancing means and boosting the torque of said crankshaft.

15. The vehicle of claim 14 wherein said piston enhancing means further comprises a plurality of piston enhancing bar magnets facing said crankshaft magnets.

16. A vehicle operated by a magnetic engine, comprising a vehicle frame fitted with front axles and front wheels rotatably carried by said front axles; rear axles spaced from said front axles and rear wheels rotatably carried by said rear axles; an engine block mounted on said frame; a plurality of cylinders provided in said engine block and a plurality of magnetic pistons disposed in said cylinders, respectively, in reciprocating relationship; a crankshaft journalled for rotation in said engine block and power transmission means connecting said crankshaft to said rear axles in driving relationship; connecting rods connecting said crankshaft to said magnetic pistons, whereby reciprocation of said magnetic pistons in said cylinders effects rotation of said crankshaft; a cylinder head provided on said engine block and piston electromagnetic means provided in said cylinder head above said cylinders and said magnetic pistons, respectively, for reversing electric current in said piston electromagnet means and alternately attracting and repelling said magnetic pistons; at least one battery carried by said frame; battery charging means carried by said frame and electrically connected to said battery for recharging said battery; dual relay means electrically connected to said crankshaft and electrically connected to said piston electromagnetic means responsive to rotation of said crankshaft; and accelerator means electrically connected to said dual relay means and said battery for operating said dual relay means, whereby rotation of said crankshaft electrically actuates said dual relay means in a selected sequence for operating said piston electromagnetic means and said magnetic pistons in said selected sequence responsive to manipulation of said accelerator means.

17. The vehicle of claim 16 wherein said battery charging means further comprises alternating current generator means mounted on said frame and said rear axle for generating an alternating electric current responsive to rotation of said rear axles and induction current amplifier means mounted on said frame and electrically connected to said alternating current generator means and said battery, for amplifying the alternating current from said alternating current generating means, converting the alternating current to direct current and charging said battery.

18. The vehicle of claim 17 further comprising piston enhancing means provided in said engine block and permanent crankshaft magnets provided in said crankshaft for magnetically interacting with said piston enhancing means and boosting the torque of said crankshaft.

* * * * *